United States Patent [19]

Duncan

[11] 3,726,253
[45] Apr. 10, 1973

[54] MILKING DEVICE

[76] Inventor: Lloyd P. Duncan, Rainbow Drive, Washington, Mo. 63090

[22] Filed: June 24, 1971

[21] Appl. No.: 156,308

Related U.S. Application Data

[63] Continuation-in-part of Ser. No. 864,042, Oct. 6, 1969, abandoned.

[52] U.S. Cl. ..........119/14.18, 119/14.47, 119/14.55
[51] Int. Cl. ..............................................A01j 05/04
[58] Field of Search........................119/14.18, 14.47, 119/14.48, 14.49, 14.50, 14.51, 14.52, 14.53, 14.54, 14.55

[56] References Cited

UNITED STATES PATENTS

| | | | |
|---|---|---|---|
| 3,482,593 | 12/1969 | Heimann et al. | 119/14.44 X |
| 1,822,680 | 9/1931 | Taylor | 119/14.53 |
| 3,557,755 | 1/1971 | Close | 119/14.49 |

Primary Examiner—Hugh R. Chamblee
Attorney—Penrose Lucas Albright et al.

[57] ABSTRACT

A milking apparatus in which the teat cups have washing and raining holes that can be uncovered by unfolding a portion of their flexible inflations. The claw and teat cup assembly can be disconnected from its milking circuits and connected to a washing manifold in a vacuum line, inverted and immersed in wash solution. Valves in the vacuum lines are manipulated so that the solution is drawn through the entire apparatus of a dual vacuum pipe and milking claw system. Washing and complete draining of the interior of the apparatus, including the space between the shell and the inflation of the teat cup, together with all pipes and lines in the system is accomplished without further disassembly. The washing and/or rinsing of the claw and teat cup assembly between cows without disconnecting any of the vacuum lines can also be effected without disassembly so that essentially, only the teat cups are contacted by solution. By unfolding the inflations from their shells, exits are exposed at the lowest part of the entire system to insure total drainage.

10 Claims, 11 Drawing Figures

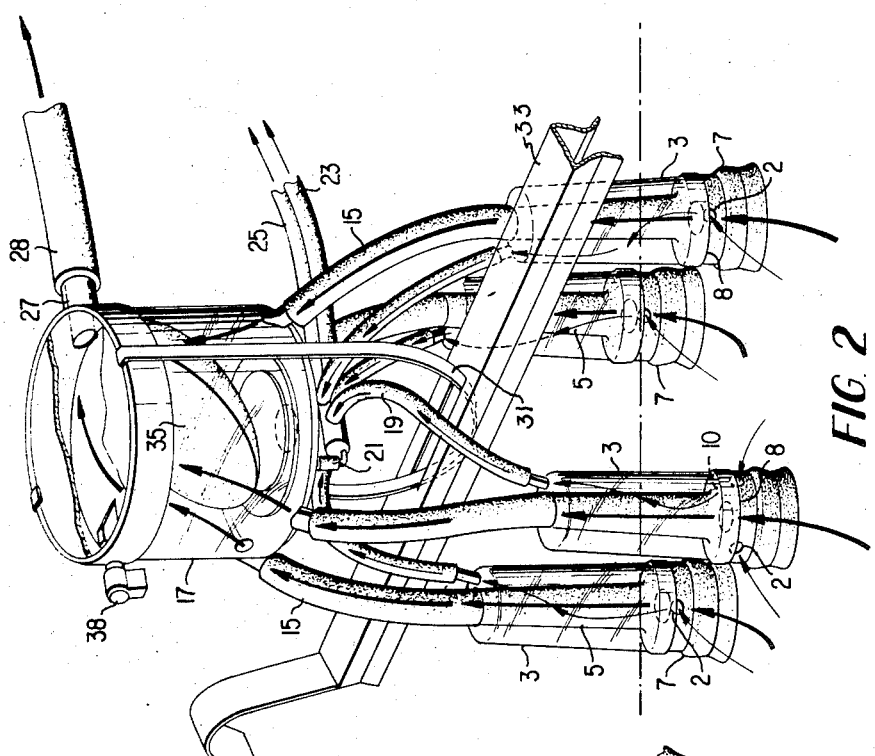
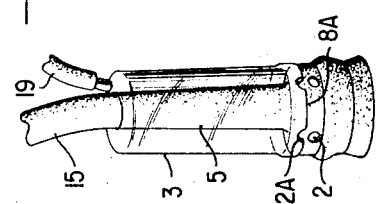
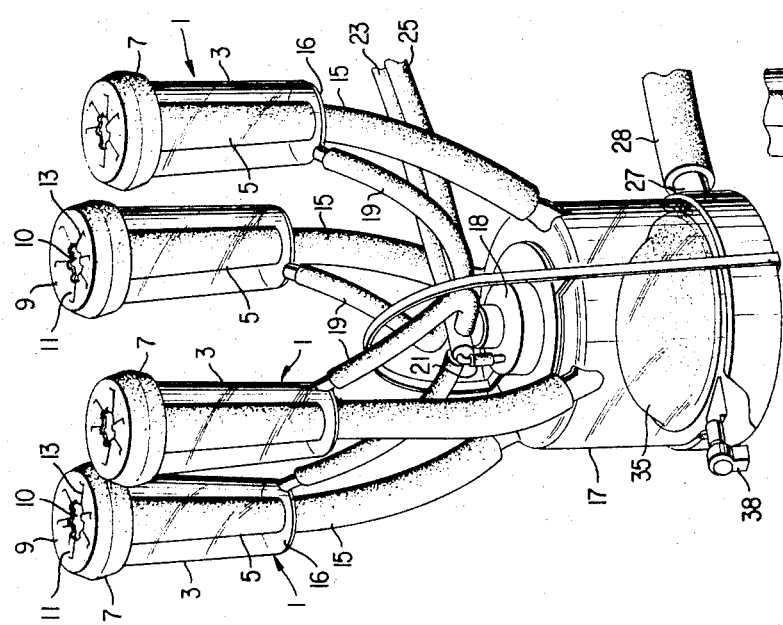
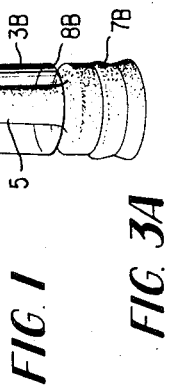
FIG. 1
FIG. 2
FIG. 3
FIG. 3A
INVENTOR
LLOYD P. DUNCAN
BY Mason, Mason & Albright
ATTORNEYS

INVENTOR
LLOYD P. DUNCAN

BY Mason, Mason & Albright
ATTORNEYS

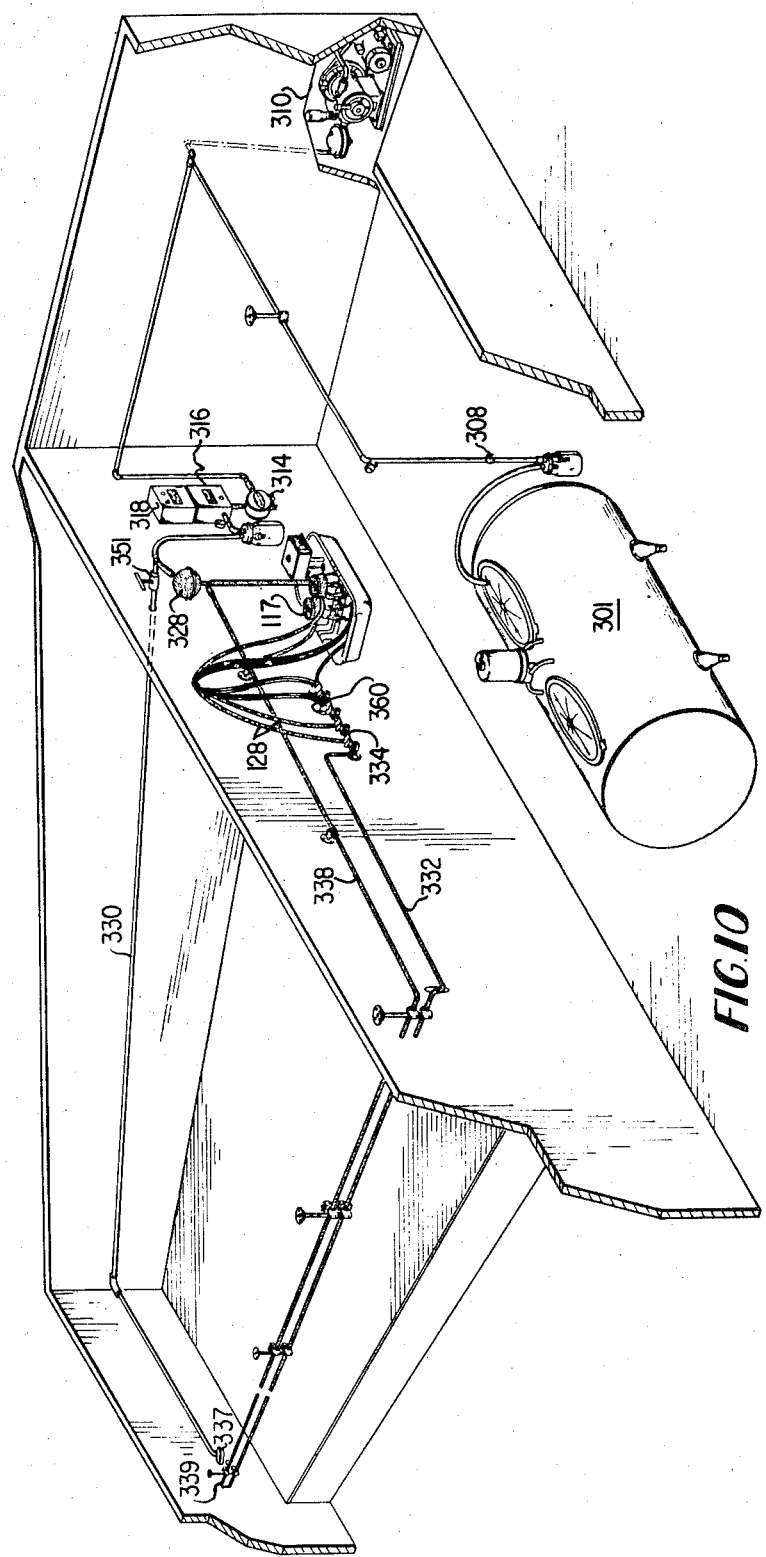

3,726,253

MILKING DEVICE

BACKGROUND OF THE INVENTION

This invention relates to a milking apparatus and particularly to the claw and teat cup assembly used with a milk receiving receptacle in a dual vacuum system. This application is a continuation-in-part of U. S. Ser. No. 864,042, filed Oct. 6, 1969, now abandoned.

The invention is more particularly concerned with providing a teat cup and claw assembly that can be easily washed and dried without disassembly and which can be immersed in a washing or sanitizing solution that is drawn or sucked through the teat cups to wash the entire milking line system. This invention finds particular application in the dual vacuum system disclosed in U. S. Pat. Nos. 3,373,720 and 3,406,663, as well as the dual vacuum line and valve system disclosed in 3,479,008. The regulator for controlling the dual vacuum system is disclosed in U.S. Pat. No. 3,482,593.

BRIEF DESCRIPTION OF THE DRAWINGS

FIG. 1 is a side elevation of a teat cup and claw mounted on receptacle in milking position.

FIG. 2 is a side elevation of the assembly of FIG. 1 in washing position.

FIG. 3 is a side elevation showing a modified teat cup.

FIG. 3A is a further modification of a teat cup.

FIG. 10 is a perspective view of the milking parlor of FIG. 7 with the milking assemblies attached to a manifold for washing.

DESCRIPTION OF THE PREFERRED EMBODIMENTS

Figure 4:
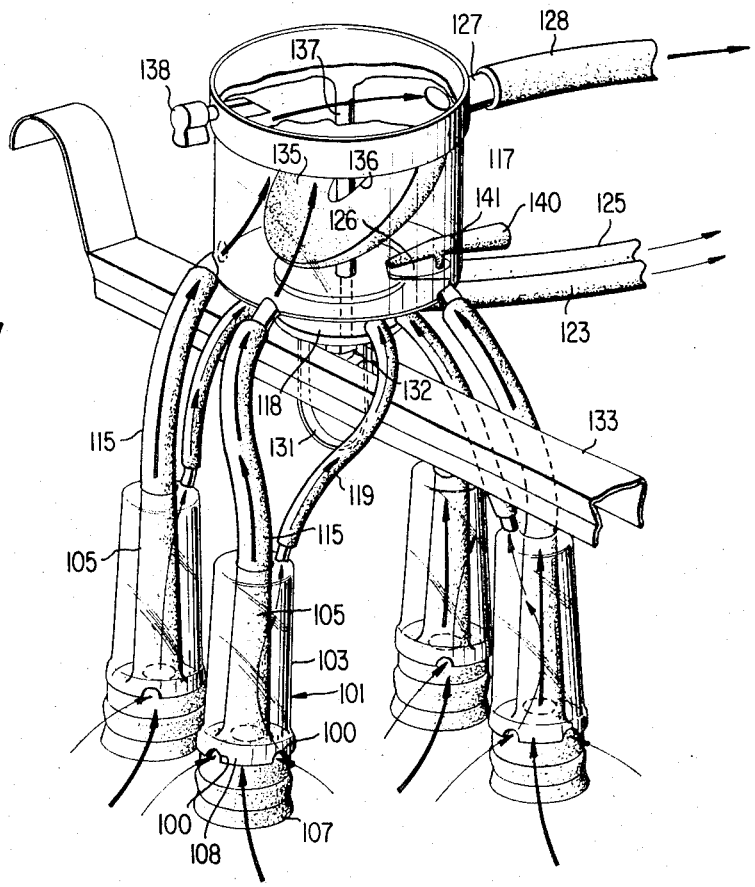
FIG. 4 is a side elevation of a modified teat cup and claw assembly in washing position.

In FIG. 1, each of the teat cups 1 includes shell 3, and inflation 5 housed within the shell 3. The inflation 5 has a foldable flange 7 that envelops the rim or perimeter 8 (FIG. 2) of shell 3. The top of the inflation is a flexible web member 9 having an opening 10 and, preferably, corrugations 11 which include slits 13 radiating from opening 10. The inflation 5 comprises part of a milk conduit 15 which extends through the bottom 16 of shell 3 to the top of a milk receiving receptacle 17. A pulsating line 19 also communicates with the interior of each shell 3 through its respective bottom 16 and is also connected to a pulsating vacuum connector line 23 mounted on an air divider 18 secured to the top of receptacle 17. The air divider 18 is connected to hose lines 23 and 25, leading to the pulsator lines 19 and into the interior of receptacle 17 respectively and each line 23 and 25 is connected to a pipe line under relatively low vacuum during milking. Line 23 leads to a pulsator 360 (FIG. 7) which is electrically operated by a timer to cycle in the conventional way.

A second source of partial vacuum, usually maintained at less pressure, or at a higher vacuum, is in communication with exit 27 at the bottom of receptacle 17 which is connected to a line 28 leading to a bulk milk collection tank. The dual vacuum system is disclosed in the aforementioned patents and applications and is particularly adapted to the structure disclosed herein because except for connecting the teat cup and claw assembly to a wash manifold, the entire system can be easily washed and completely drained without disassembly.

The exit 27 is closed by float valve 35 hinged near the exit to preserve the dual vacuum arrangement. Plunger 38 is slideably received in an air-tight connection in the side of receptacle 17 to force float 35 open if desired. Thus, float valve 35 rises when milk is received in receptacle 17 to allow the conveying vacuum to draw the milk to a cooled collection tank. When milk flow stops, the valve 35 shuts exit 27 preventing contaminating air from entering line 28 and permitting a higher partial vacuum to be maintained in line 27 than in lines 23 and 25.

In FIG. 2, the entire milking unit has been inverted and immersed in a water rinse, the unit resting on handle 31 and rack 33 with the ends of the teat cups extending below the liquid level (dotted line). Each inflation 5 has flanges 7 that are unfolded to expose one or more apertures 2 located adjacent the juncture of the rim 8 of shell with inflation 5. Preferably, there are at least three holes in the inflation 5 but additional holes can be also formed at the rim 8 of the shell 3 to the end that no puddles be formed and complete drainage takes place. Flange 7 must be foldable to cover and seal each aperture during milking so that pulsating messages are effective.

In FIG. 3, the shell 3 has a rim 8A in which one or more semi-circular recesses 2A are formed to allow for the passage of wash or rinse fluid. The inflation 5 can also have recesses which register with those in the shell 3. As seen in FIG. 3, the inflation 5 has been pulled downwardly to fully expose holes 2.

In FIG. 3A, a modified shell 3B and inflation at the end of the teat cup are shown in which an aperture between the rim 8B of the shell and the flange 7B of the inflation, is formed inherently all around the top of the teat cup. The aperture is formed when the flange is unfolded since the inflation only contacts the top of the shell through the flange 7B when the latter is folded.

In FIG. 4, a unit similar to that of FIGS. 1 and 2 is shown with teat cups 101, including a shell 103 and inflation 105 with foldable flange 107 that envelops rim 108 of the shell during milking. The top of the inflation 105 is the same as that described in connection with FIGS. 1 and 2. Each inflation also includes a milk conduit 115 which is passed through a hole in the bottom 116 of shell 103. A pulsating line 119 of each cup is connected to a pulsating tube 123 through air divider 118 at the top of a milk receiver 117, the same as in the FIG. 1 arrangement. Vacuum line 125, however, is fitted on a cylindrical inlet 126 which extends within receiver 117 and a valve 140 is slideably fitted in a hole 141 formed in the side of the receiver adjacent inlet 126.

Figure 5:
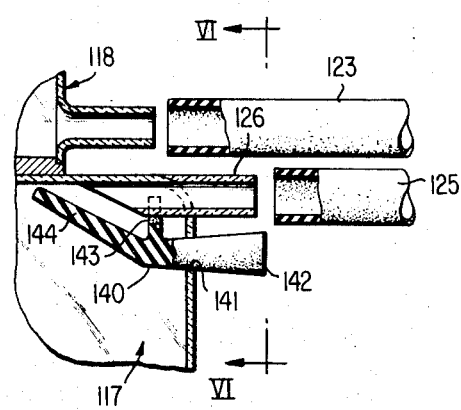
FIG. 5 is a section of the milk rectacle of FIG. 4 showing the valve member for the vacuum line leading into the upper part of the receptacle.

Valve 140 has a tapered handle portion 142 which extends through hole 141 to fit snug and prevent any air from entering the receiver during milking as seen in FIG. 5. The flat end 144 opposite handle portion functions as a baffle during milking and thus prevents splattered milk from entering inlet 126 and line 125.

Figure 6:
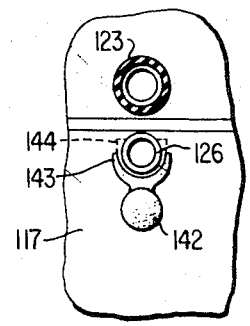
FIG. 6 is a view taken along the lines VI—VI of FIG. 5.

The valve 140 has a pair of clasper arms 143 that partially encircle inlet 126 (FIG. 6) and guide the valve when it is moved. Sliding the valve 140 from its milking position to close inlet 126 results in partly exposing opening 141 and relieving the partial vacuum established in receiver 117 to quickly release the teat cups 101 from the cow's teats. Thus, ambient pressure is quickly established through hole 141 while the entrance to inlet 126 is covered by valve end 144 and partial vacuum prevented from re-establishing itself. After the teat cup and claw assembly is released, the valve 140 can be pushed into completely block hole 141 and allow air to be drawn through inlet 126. The unit can then be inverted and washed as seen in FIGS. 4 and 10, so that washing and/or rinsing solutions are drawn through lines 123, 125 and 128.

Handle 131 can be inserted in slot 132 of rack 133 so that the teat cups are partially submerged in washing and/or rinsing solution. Float valve 135 in this unit has a slot 136 through which guide 137 extends and plunger 138 can be used to break the suction of outlet 127 and line 128 so that the solution circulates thoroughly through the unit.

As seen in FIG. 4, a series of cut-out portions 100 are formed in the rim 108 of shell 103 to allow passage and complete drainage between the inflation 105 and the interior of shell 103. Thus, a space or spaces are formed between the top inflation 105 and rim 108 when the flanges 107 are unfolded. When folded, the flanges 107 have the same appearance as seen in the FIG. 1 device.

During milking, it is desirable to wash and/or rinse the teat cups in the assembly between cows without washing the bulk milk tank or the vacuum lines 123, 125 and 128 leading from the receiver to the other parts of the pipe line system. When line 128 is under a reduced pressure of say 18 – 25 inches Hg and lines 123 and 125 are under less severe reduced pressure, say 7 $\theta$ 10 inches Hg, float valve 135 blocks exit 127 once substantially all the milk has been sucked out through line 128 to the bulk milk tank. The operator then withdraws valve 140 to permit entry of ambient atmosphere into receiver 117 so that the receiver together with teat cup assembly are quickly released from the cow. Valve 140 is then held by the vacuum in line 125 closing inlet 126 in the line.

The teat cups are unfolded and then inverted so that the rims 108 of shells 103 are positioned below the waterline of the wash and/or rinse solutions allowing the solutions to clean the cups and those portions of lines 115 and 119 immersed. Float 135, however, is held against the bottom of receiver 117 even though the latter is upside down by reason of the relatively high vacuum maintained in line 128. Ambient atmospheric pressure is established within receiver 117 because valve 140 stays closed to line 125 allowing air to enter through hole 141. Thus, only the teat cups, including the inflation, inside and out, are exposed to the solutions and the complete draining of the cups is accomplished by suspending the assembly upside down and unfolding the flanges 107. The lines 123, 125 and 128, however, are not disconnected as is done during total washing when all lines and pipes are washed. Moreover, the pulsator 360 need not be disconnected but can remain functioning because the receiver is open to ambient pressure and solution will not be drawn into the receiver.

Figure 7:
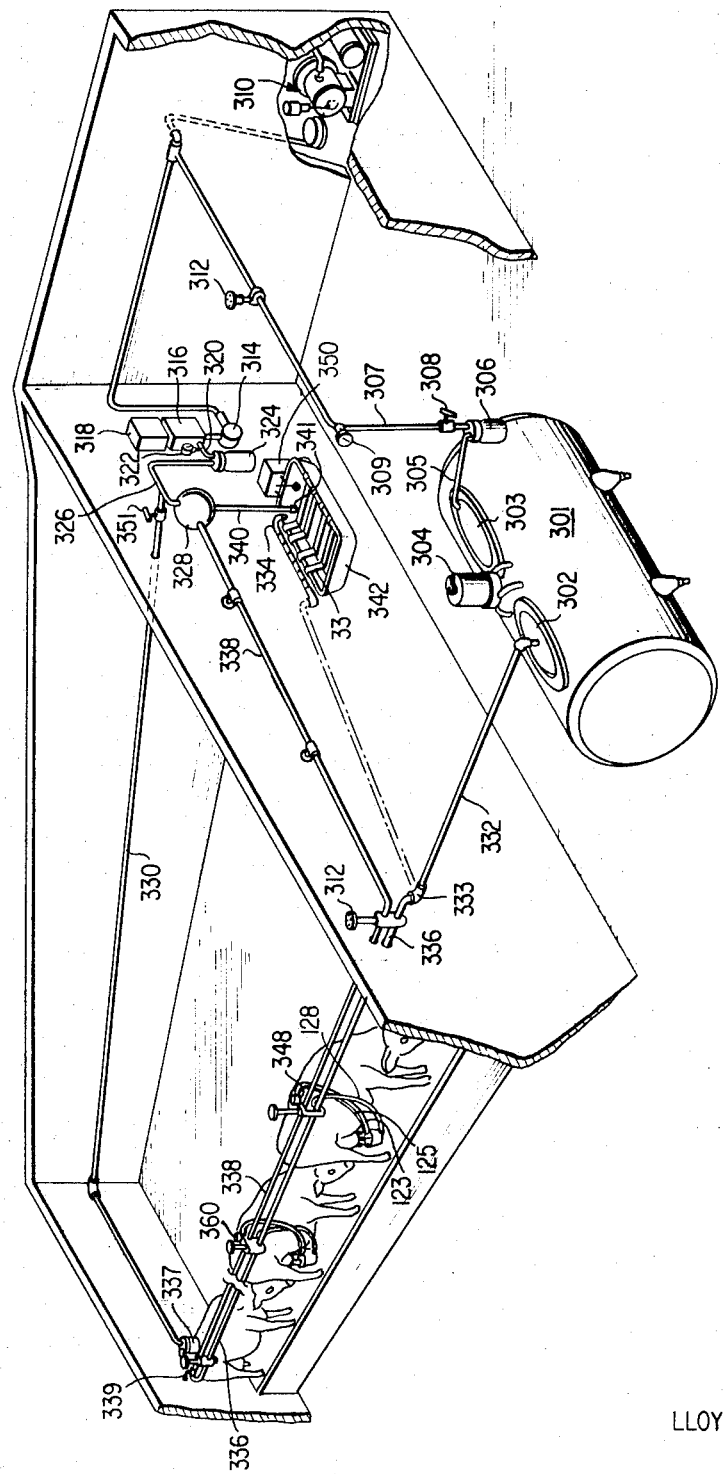
FIG. 7 is a perspective view of a milking parlor in which the dual vacuum system is installed.

In FIG. 7, bulk milk tank 301 has lids 302 and 303 and an agitator 304 mounted between the lids. Line 305 leads out of lid 303 and is connected to a self-draining trap 306 which in turn is connected to high vacuum line 307 to which valve 308 and gauge 309 are affixed. Valve 308 is open when milking and a source of vacuum, pump 310, is connected to line 307 to establish a relatively high vacuum in tank 301, in the order of 18 – 25 inches Hg.

All pipes and lines, including vacuum line 307 can be suspended from the milking parlor ceiling by supports 312 or mounted on the walls of the parlor. A control assembly is mounted on a wall of the milking parlor so that line 307 leads in a differentiator or vacuum regulator 314. The regulator establishes a lower vacuum (see Ser. No. 606,770, now U.S. Pat. 3,482,593) and is connected to washer-timer box 316, pulsator control 318 and line 320. Line 320 with gauge 322 is connected to a further trap 324 and a further line 326 is connected to the top of a wash jug 328. A "T" connection is fitted on line 326 to which pipe 330 is connected.

The time control assembly, box 316 is a conventional electrical unit that automatically times the washing of the vacuum lines and claw assemblies. The pulsator control 318 electrically signals each pulsator 360 with the correct ratio for safe and fast milking.

Milk pipe 332 conducts milk through lid 302 when a partial vacuum is established in tank 301 by pump 310. The pipe 332 has a swivel joint 333 so that the entire pipe can be swung to dotted line position and attached to manifold 334 when the system is being washed. During milking, however, line 332 is a source of relatively high partial vacuum (18 – 25 inches Hg) which leads to the exits 27 or 127 of their respective receivers through line 336 and in turn to lines 28 and 128 attached to the receiver. A solid stream of milk through pipe 332 that is relatively air free is attained in the dual system primarily because there is no fluctuation in line 336 and lines 28 and 128.

A less severe vacuum (7 – 10 inches Hg) is established in line 338 via jug 328 by regulator 314 and line 338 is connected to pulsators 360 connected to pulsator lines 23 or 123 as well as vacuum lines 25 or 125. Discharge pipe 340 for draining jug 328 is positioned over wash sink 342 and at the bottom of pipe 340 a check valve 341 is normally closed.

Figure 8:
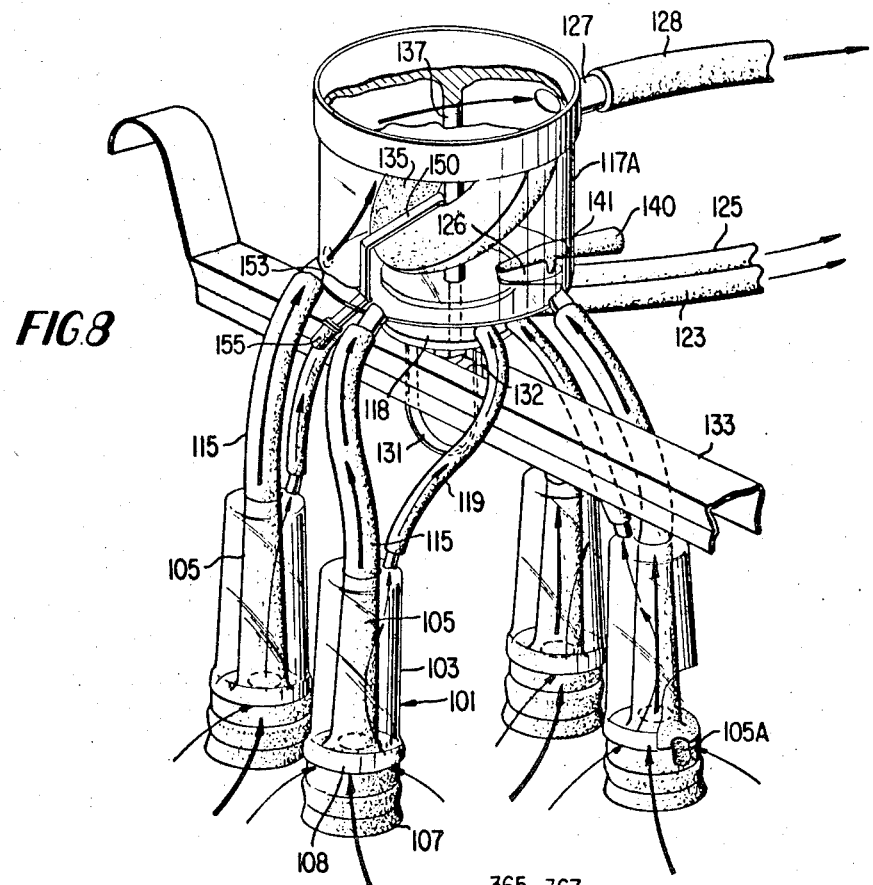
FIG. 8 is a side elevation of a teat cup and claw assembly similar to that of FIG. 4 with a modified bottom valve lift.

In FIG. 8, a teat cup and claw assembly, similar to that of FIG. 4, but with plunger 138 replaced by a lift rod, otherwise the elements are the same and identical numbers are used. A lift rod 150 is bent to extend below float valve 135 within the receiver 117A. The rod is bent to extend upwardly within the receiver and through an aperture 155 at the top of receiver 117A to terminate in a knob 155 for manual use. Thus, to break float valve 135 from its vacuum seat, the knob 155 is pulled up and rod 150 lifts the valve. The inflations of FIG. 8 have grooves 105A and the rims of shells 103A need not be cut out.

The possibility of leaking milk during operation is eliminated with the FIG. 8 improvement and the minor leaking through aperture 155 experienced when receiver 117A is inverted during washing is of no moment. Also, air leakage during milking is small and is removed from he top of the receiver so that no foaming or air bubbles form in the milkline leading to the bulk collection tank.

Figure 9:
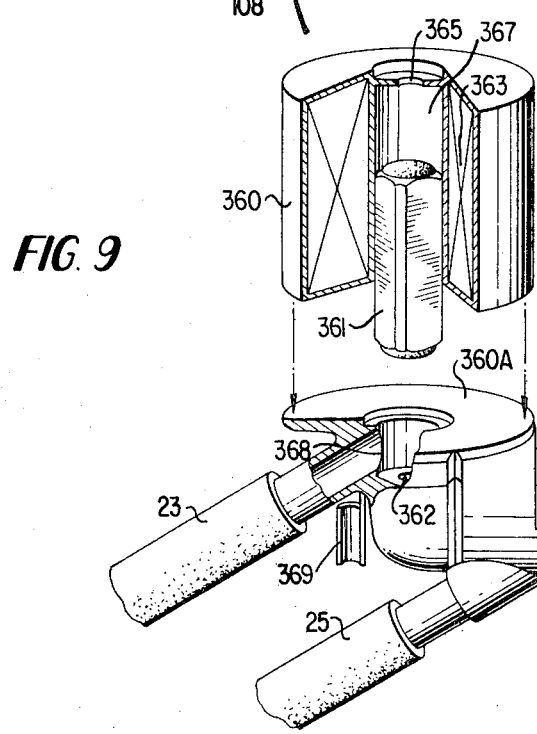
FIG. 9 is a side elevation of the pulsator and its connections with parts broken away.

In FIG. 9, pulsator 360 is shown filled on vacuum line 338 through outlet fitting 358 and nipple 359 of the pulsator. Pulsator line 23 is lead in the bottom of the pulsator to periodically allow partial vacuum and ambient pressure through the line as weighted plunger 361 alternately is raised by solenoid 363 and allowed to fall. Raising plunger 361 by applying current to solenoid 363 seals opening 365 and discontinuing the current allows plunger 361 to fall through the channel 367 n the core of the pulsator to rest on seat 362. Closing line 23 to the vacuum line 338. Plunger 361 is loosely fitted in channel 367 so that ambient air is allowed to pass opening 365 to line 23. Constant partial vacuum is applied through line 25 to the upper part of receiver 117. An internal disc valve closure 348 is located within fitting 358 to be turned by handle 357 to open or shut the fitting.

During washing, each pulsator 360 is connected to manifold 334 through its respective nipple 359. Relatively higher vacuum line 128 is also connected to the manifold so that the pulsator and all of the lines are washed. Opening 365 permits some air to be drawn in during wash to cause turbulence and improve washing the electrical connectors to the solenoid 363 and the holding brackets for the pulsators (not shown) are clip-on electric connection units which receive contacts 369 during operation but which remain on line 338 during washing. The solenoid coil 363 itself is jacketed and sealed from water.

It will be appreciated that during milking, a dual vacuum system is established with a high vacuum leading from the tank 301 to the outlet in the bottom of each milk receiver when attached to a cow and milk is drawn to the tank 301 via line 336 and pipe 332. A lower vacuum is established through differentiator 314 and also through lines 330 and 338. Line 330 with trap 337 is not needed unless a relatively large number of cows are being milked. However, line 338 is connected to the two lines 23 and 25 leading in the air divider of the FIG. 1 device or lines 123 and 125 of the FIG. 4 device. During milking, valve 339 is normally closed to preserve the dual vacuum. As mentioned above, lines 23 and 25 lead to a conventional pulsator 360 and each pulsator is connected to an outlet in line 338. Valve closures 348 are provided in each vacuum line 336 and 338 to shut off the outlets when the pulsator 360 and milk line 28 or 128 are disconnected from the vacuum lines.

When the lines and milking assemblies are to be thoroughly washed, the teat cups are released from the cows and closures 348 turned to shut the outlets leading into lines 336 and 338. Pipe 332 is swiveled and attached to one end of manifold 334 to slope downwardly, valve 308 is closed and valve 339 is opened. Soap dispenser 350 houses both not and cold water inlets and is cycled to fill sink 342 with wash and/or rinse solutions.

The assemblies are then positioned on racks 33 or 133 as seen in FIG. 10, and in detail in FIG. 1 or FIG. 4 respectively and the inflations are unfolded from their respective shells and suspended in the solution in sink 342. The pulsator nipple 359 of each assembly is attached to manifold 334 as is each milk line 28 or 128 so that two connections are needed on the manifold for each teat cup assembly. Only low partial vacuum (7 – 10 inches Hg) is used to circulate the wash and/or rinse solutions through the teat cup and claw assemblies, pipes 332, 336, open valve 339 and line 338 and finally jug 328. If line 330 is used, it is shut off by valve 351 before washing. Once sufficient wash and/or rinse solutions are returned to about half fill jug 328, a switch in the timer box can be set to open the line 320 to atmospheric air. Check valve 341, which is a conventional flap-type, normally closed due to suction, is then allowed to open under the weight of expanded solution so that the solution can drain to sink 342. Establishing low vacuum again closes valve 341 and drain pipe 340.

From the foregoing, it will be apparent that all of the milk lines and pipes as well as the air or vacuum lines in communication with the teat cup assemblies, are exposed to washing and/or rinsing solutions. Further, the rinsing and/or washing solutions are totally drained from the pipes, lines and teat cups when the sink 342 is drained and the inflations are unfolded (FIG. 1 or FIG. 4) to permit gravity draining through the lowest part of the pipeline system.

The milk receivers, traps, lines and pipes are preferably constructed of transparent material to facilitate visual inspection. The metal parts, such as the pulsator and fittings are formed of stainless steel to permit thorough and total washing.

Another advantage of the milking unit which can be attributed to the claimed teat cup structure is that the foldable inflation, when assembled for milking (FIG. 1) has a stretched bore and web. The thin rubber is more "alive" when stretched and the enlarged bore readily accepts cow teats of various sizes and actually milks faster by massaging during operation. In this respect, the stretched bore and web have the advantages of the three piece or multipiece inflation which are used in some parts of the United States, particularly in the western states. The three piece unit normally includes a metal ring to stretch the bore which is assembled with special tools. Such inflations, however, have the disadvantage of being difficult to wash unless disassembly is carried out and have not been widely adopted for this reason.

If the inflation of FIG. 3A is folded, it will be appreciated that the flange 7B tightly fits over the rim 8B of the shell to stretch the top of the bore as well as the web. Since, milking on the average, results in using the unit about two hours every day, the unstretched or inoperative draining position (FIG. 3A) is assumed about 22 hours per day which insures the long life and preserves the natural resilience of the rubber or vinyl inflation.

Almost all one piece rubber inflations, when new, are stretched but quickly lose resiliency. Only when the claimed inflation is levered in place, are the bore and the web stretched.

When folding the rubber inflation over the shell rim, the flange creases are pulled into place over the rim stretching both the web and upper portion of the bore. When unfolded, the inflation flange 7B leaves a drainage space all around the rim 8B to permit complete drainage at the lowest part of the assembly. The holes 2 in the FIGS. 2 and 3 inflation insure that washing and drainage take place all around the periphery of the inflation, namely, the lowest place where the assembly is washed.

The importance of circulating and draining the treating solutions through the inflations, their respective shells and spaces between same cannot be overestimated when it is realized that dirt, foreign odors and other contaminants such as flies, dirt particles and the like eventually find their way to these areas and for years there simply was no practical way to eliminate the contaminants short of periodic disassembly. With applicant's combination, however, complete cleaning is accomplished with full drainage. Moreover, exposing the spaces between the shells and their inflations not only permits complete draining, but also allows air to be subsequently circulated through the spaces to dry the unit.

What is claimed is:

1. A pipeline milking system comprising a claw and teat cup assembly with a milk receiving receptacle, said receptacle having a milk exit adjacent the bottom thereof and a hinged float valve overlying said exit for exposing and closing said exit responsive to the amount of milk in said receptacle, a pipeline with a first partial vacuum connected to said exit for drawing milk from said receptacle to a collection tank, each of said teat cups comprising a shell and an inflation housed within said shell, said inflation including a milk conduit at one end extending through the bottom of said shell to communicate with the upper portion of said receptacle, a second partial vacuum pipeline connected to a pulsator and to the upper portion of said receptacle, said inflation having a mouth portion comprising a flexible web member with a teat receiving opening and foldable flange surrounding the perimeter of said web member, said flange means being foldable to cover the upper rim of said shell during milking and unfoldable to expose an opening between the sidewall of said inflation and said shell, said opening being located between the unfolded flange of the inflation and the upper rim of said shell, whereby said assembly can be inverted and immersed in a solution to allow washing and complete draining of the milking unit, including the interior of said shell, through said opening.

2. The system of claim 1 wherein said opening includes a plurality of grooves in the sidewalls of said inflation and said grooves are exposed when said flange is unfolded.

3. The system of claim 1 wherein said opening is located substantially completely around said inflation and the upper rim of said shell.

4. The system of claim 1 wherein a plunger valve is positioned in said receptacle to raise said float valve and expose said exit during washing.

5. The system of claim 1 wherein a valve opening means is provided in a wall of said receiver, said opening means being closed by a tapered valve during milking, said plug being slideable to expose said opening means and the interior of said receptacle to ambient pressure.

6. The system of claim 5 wherein said plug has an enlarged end which extends in said receptacle over the exit to the second vacuum to block same when said opening means is exposed.

7. A washable pipeline milking system comprising a claw and teat cup assembly which includes a plurality of teat cups connected to a receptacle, said teat cups and receptacle being connected to a pulsator and collection tank respectively through the pipelines of said system to establish a partial vacuum in said assembly, each teat cup in said assembly including a shell and a flexible inflation housed within said shell, the upper part of said inflation being resilient and having a mouth and a foldable flange surrounding said mouth, said flange being foldable over the upper edge of said shell during milking and unfoldable during non-use to expose an opening between the sidewall of said inflation and said shell, said opening being located between the unfolded flange of the inflation and the upper rim of said shell whereby said assembly can be inverted, washed and completely drained through said opening.

8. The system of claim 7 wherein said system includes a washing manifold and said assembly together with the pulsator are connectable to said manifold for washing.

9. A washable teat cup comprising a shell and a flexible inflation housed within said shell, the upper part of said inflation being resilient and having a mouth and a foldable flange surrounding said mouth, said flange being foldable over the upper edge of said shell during milking and said flange being unfoldable during non-use to expose an opening between the sidewall of said inflation and said shell, said opening being located between the unfolded flange of the inflation and the upper rim of said shell, said teat cup being invertable to position said opening at the lowermost location of said shell and permit the circulation of washing solution through the interior of said teat cup and the complete draining of said teat cup through said opening.

10. The system of claim 9 wherein the upper part of said inflation is in a stretched condition when folded over the upper edge of said shell, and in a relaxed unstretched condition when said flange is unfolded for washing and non-use.

* * * * *